Dec. 7, 1943.  A. H. BAYER ET AL  2,336,213
APPARATUS FOR BAGGING CONFECTIONERY PRODUCTS
Filed Sept. 17, 1942  3 Sheets-Sheet 1

INVENTORS
Abraham H. Bayer
Gordon Beyette
BY
Richard Newling
ATTORNEY

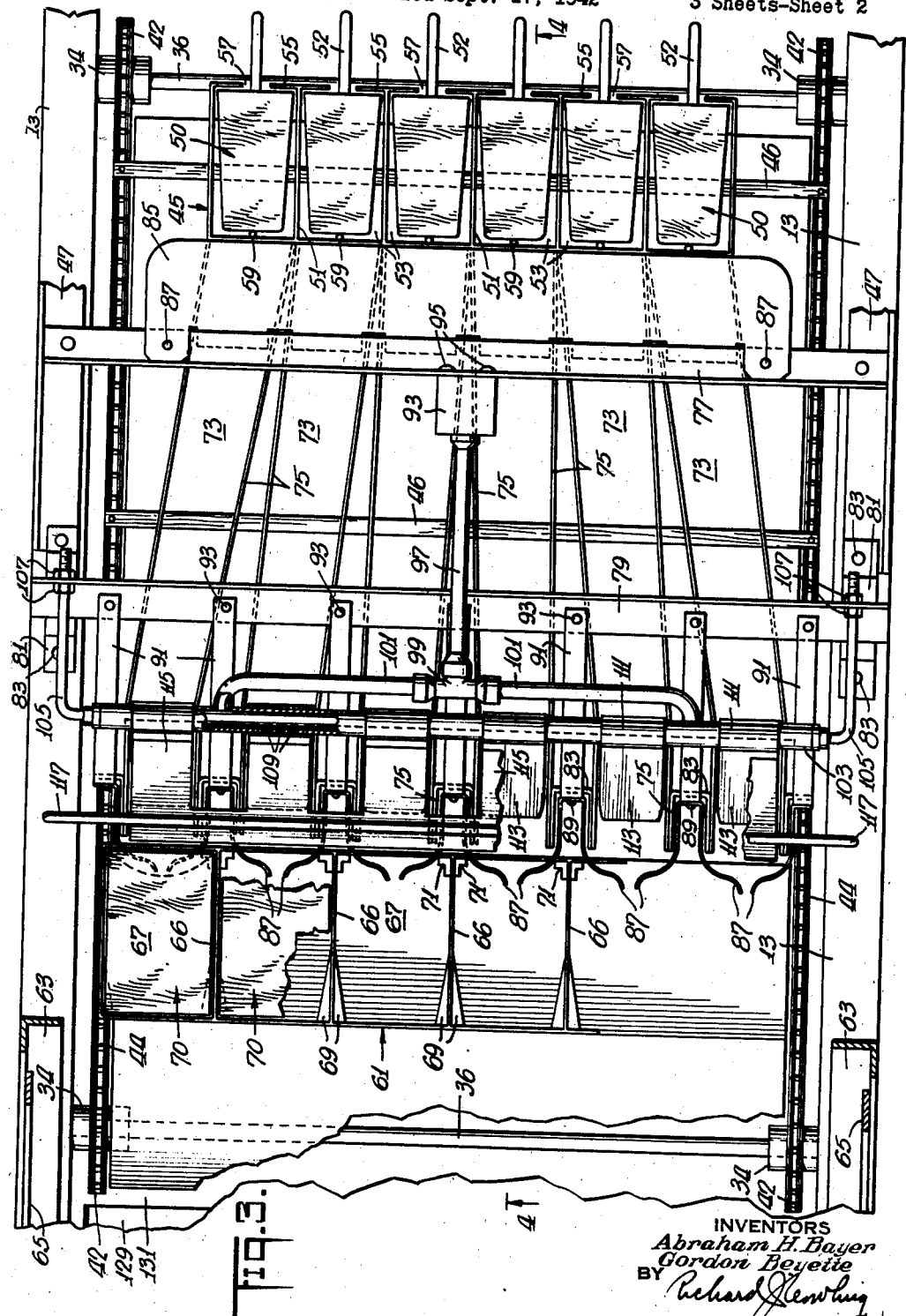

Dec. 7, 1943.    A. H. BAYER ET AL    2,336,213
APPARATUS FOR BAGGING CONFECTIONERY PRODUCTS
Filed Sept. 17, 1942    3 Sheets-Sheet 3
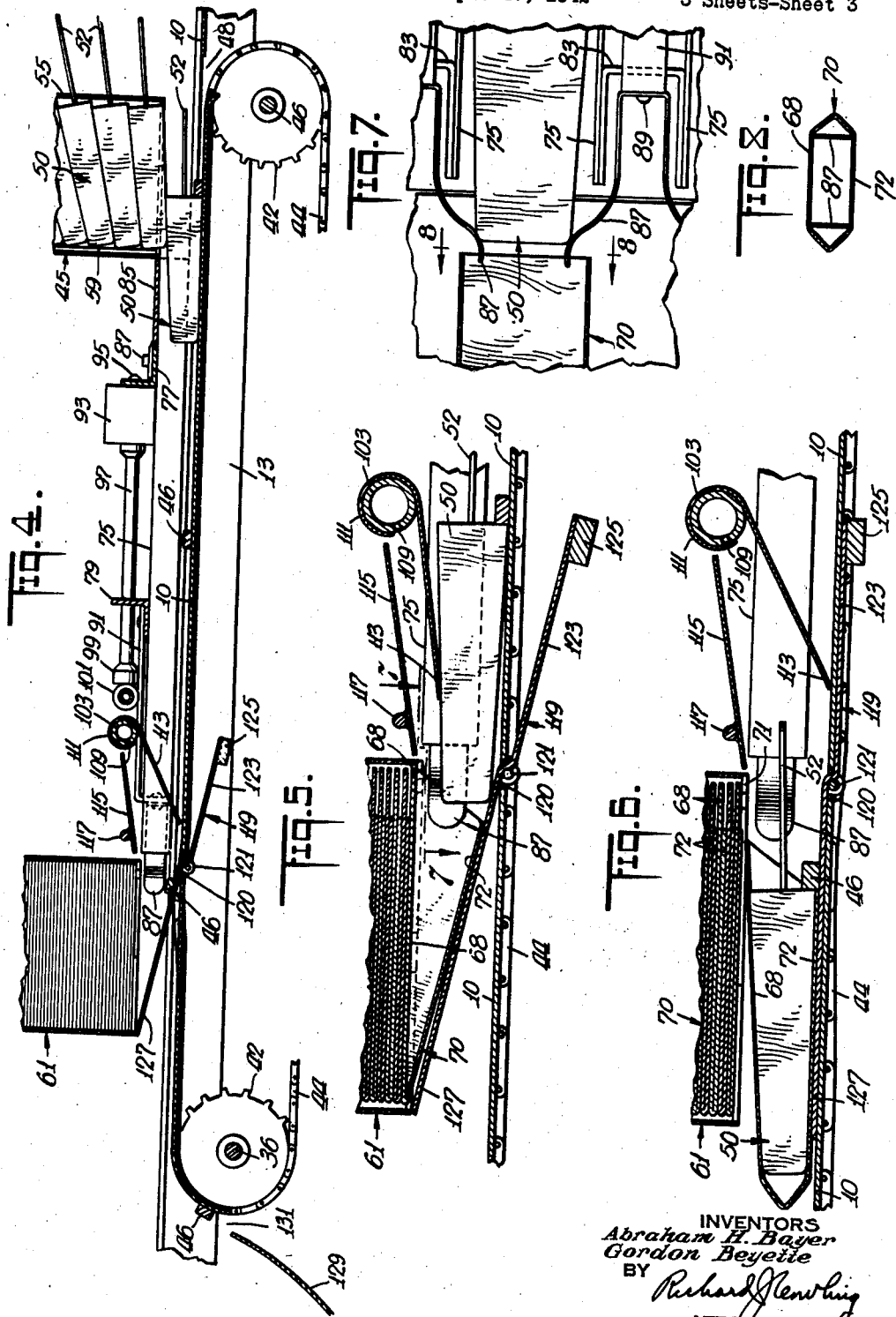
INVENTORS
Abraham H. Bayer
Gordon Beyette
BY
Richard J. Newling
ATTORNEY Patented Dec. 7, 1943

2,336,213

UNITED STATES PATENT OFFICE 2,336,213

APPARATUS FOR BAGGING CONFECTIONERY PRODUCTS

Abraham H. Bayer, Schenectady, N. Y., and Gordon Beyette, West Haven, Conn., assignors to General Ice Cream Corporation, Schenectady, N. Y., a corporation of New York Application September 17, 1942, Serial No. 458,698

14 Claims. (Cl. 226—49)

The present invention relates generally to article handling apparatus, and it has particular relation to apparatus for receiving a plurality of rows of stacked frozen confectionery products from a conventional stickholder or spur plate and positioning them into individual glassine or other types of open-ended vegetable parchment bags.

At the present time such confectionery products are made in large quantities in either ice cream or frozen confection manufacturing plants either in the form of a bar or in the form of a stick confection. The operation of bagging such confections in such plants is slow and laborious because each of the confections must be individually inserted manually into its respective bag, making the operation of bagging expensive as compared to the remaining operations of the process. When the confections are provided with a handle stick, the stick affords suitable means for handling and manipulating the edible portion during the bagging operation, but when such confections are of the bar type, having no handle stick, it is necessary for the operator to pick up each confection by hand for insertion into its respective bag, which handling is highly objectionable from a sanitary standpoint.

With the present invention all of the aforementioned disadvantages have been obviated, and the apparatus is capable of receiving a plurality of rows of confections from a conventional stickholder or spur plate in stacked relationship in a magazine, remove the bottom confection of each row and deliver it into its respective bag, whereupon the bagged confections are then discharged into a receiving chute from which they are manually removed and boxed for delivery to the trade. The present apparatus may be built to any suitable size and capacity, as desired, but the size shown illustratively in the drawings is capable of bagging about three thousand dozens of confections in an eight hour period without requiring the individual confections to be handled in any way whatsoever.

An object of the present invention is to provide a simple, inexpensive and econimical apparatus, which is of a durable construction, and which is capable of bagging large numbers of confectionery products, with or without handle sticks, in an efficient, inexpensive and sanitary manner.

Another object of the invention is the provision of apparatus that is capable of receiving a plurality of rows of spaced confectionery products from a conventional portable stickholder or spurplate, whereupon they may be mechanically inserted into individual bags in an efficient and sanitary manner with a minimum number of operating steps.

A further object of the invention is to provide an apparatus which is capable of receiving a plurality of rows of spaced confections from a suitable portable manipulating carrier, deliver each of said confections to an individual bag and insert the same therein without damage to such confections or to the bags, and without requiring any manual assistance from the operator.

Another object of the invention is the provision of apparatus which is capable of receiving one or more rows of confectionery products from a conventional portable carrier, deliver and position each of said confections into individual bags independently of any of the other confections in the apparatus.

A further object of the invention is to provide simple and inexpensive apparatus for bagging confectionery products made with or without a handle stick, which does not require any adjustment, attachments or alteration for handling either type of product, but permits both types of products to be handled interchangeably and simultaneously therein.

Another object of the invention is to provide an apparatus of the character described with a suitable bag opening and holding means which is controlled only by movement of a confection therethrough, whereby a bag will be opened and used only when a confection is ready to be positioned therein.

A further object of the invention is to provide suitable air blowing means for opening a closed bag in a bag magazine when a confection approaches said magazine, for holding said bag in open position in said magazine, for the insertion of the confection therein, and for finally discharging the bagged confection therefrom.

Other and further objects and advantages of the invention, which result in simplicity, economy and efficiency will be apparent from the following detailed description, wherein a preferred form of embodiment of the invention is shown, reference being had for illustrative purposes to the accompanying drawings, forming a part hereof, in which:

Fig. 3 is an enlarged fragmentary plan view of the apparatus shown in Fig. 1, showing in detail confections positioned in the confection magazine, the guideways or passageways through which the confections are moved to the bagging magazine, and the bag magazine;

Fig. 4 is a longitudinal fragmentary sectional view of that portion of the apparatus shown in Fig. 3, the same being taken along the line 4—4 thereof, looking in the direction of the arrows;

Fig. 5 is an enlarged longitudinal fragmentary sectional view showing certain details of the confection bagging mechanism shown in Fig. 4;

Fig. 6 is another enlarged longitudinal sectional view of the confection bagging mechanism shown in Fig. 5, but illustrating the position of the various parts as a confection is being advanced for insertion into the open end of a bag held in the bag magazine;

Fig. 7 is an enlarged fragmentary cross-sectional view of that portion of the apparatus shown in Fig. 5, the same being taken along the line 7—7 thereof, looking in the direction of the arrows; and Fig. 8 is a cross-sectional view of that portion of the apparatus shown in Fig. 7, the same being taken along the line 8—8 thereof, looking in the direction of the arrows.

Figure 1:
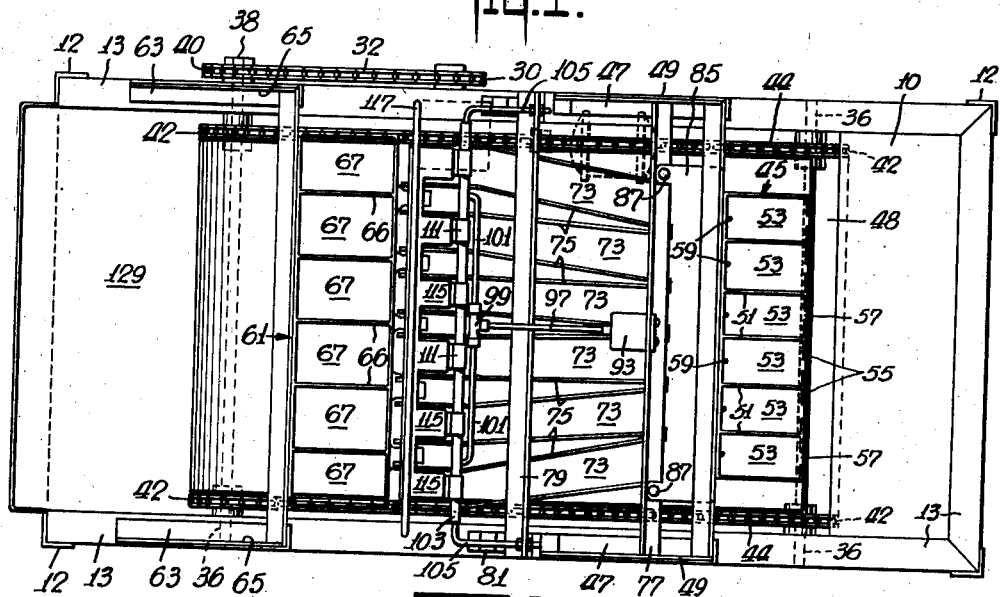
Fig. 1 is a top plan view of an apparatus constructed in accordance with the invention.
Figure 2:
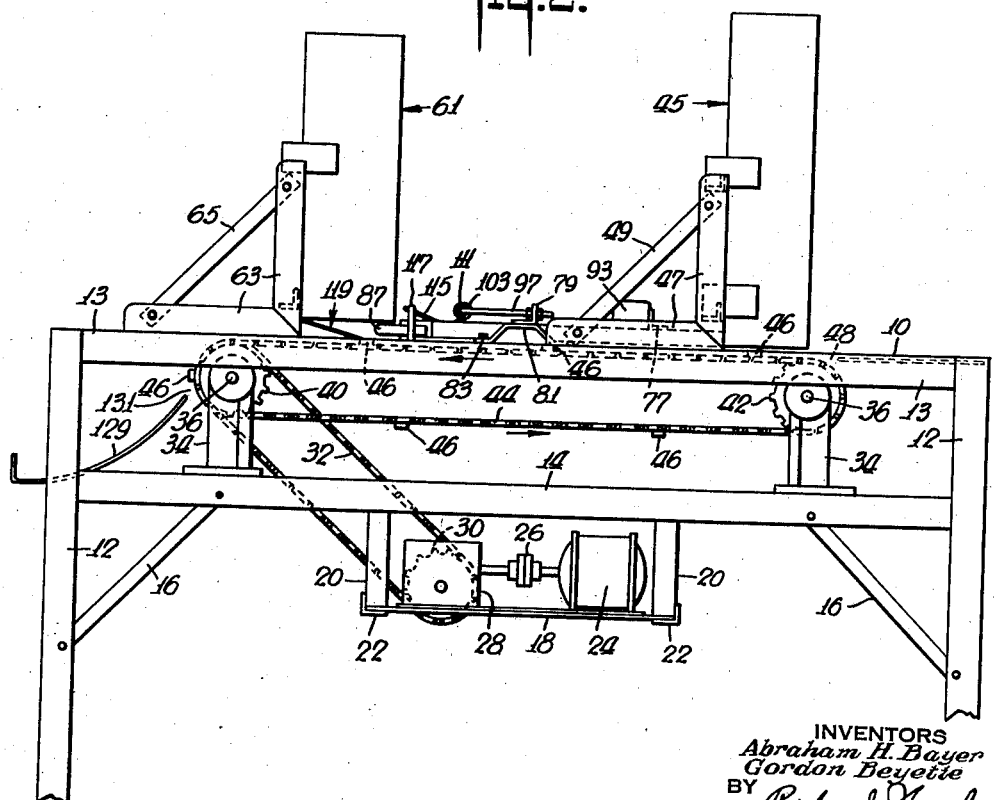
Fig. 2 is a side elevational view of the apparatus shown in Fig. 1.

Referring now to the drawings, wherein like numerals indicate like parts, there is shown in Fig. 1 a table top supporting platform 10, suitably mounted upon a plurality of spaced upright angle iron legs 12, and having an angle iron reinforcing and covering edge strip 13. A shelf 14 is mounted underneath the platform 10 on the legs 12, and is additionally braced by suitable flat bracing strips 16. A smaller shelf-like supporting structure 18 is suspended intermediate the ends of the shelf 14 by suitable angle iron depending supports 20 and horizontal angle iron supports 22. A conventional electric motor 24 is mounted on the supporting structure 18, which in turn is connected by a flexible coupling 26 to a conventional reduction gear unit 28, having a sprocket driving gear 30 for driving a chain 32.

A pair of upright supporting brackets 34 are mounted on opposite sides of the shelf 14 adjacent each end thereof, and each pair of brackets 34 has a shaft 36 rotatably mounted on its upper end, which shafts project outwardly beyond the brackets 34 on opposite sides of the apparatus. On the projecting end of one of the shafts 36 there is fixedly mounted a sprocket wheel 40, which is, in turn, operatively connected by the endless driving chain 32 to the driving sprocket wheel 30 of the reduction gear unit 28. Each of the shafts 36 has a sprocket wheel 42 mounted fixedly thereon adjacent each end, and the sprocket wheels 42 on each side of the table top supporting platform 10 are connected by an endless chain 44. The chains 44, which extend longitudinally of the platform 10 along each side thereof, are connected transversely at longitudinally spaced intervals by a series of pusher bars 46, which are adapted to be substantially slid along the upper surface of the supporting platform 10 when the chains 44 are in motion. A suitable transversely extending slot 48 is provided in the supporting platform 10 to permit the pusher bars 46 to pass upwardly onto the same.

A confection magazine 45 is mounted adjacent one end of the apparatus by a transversely spaced pair of upright supporting brackets 47 secured in any suitable manner to the upper surface of the supporting platform 10, which brackets are appropriately obliquely braced by suitable bracing strips 49. The magazine 45 is spaced vertically above the top surface of the supporting platform 10 at a height sufficient to permit passage of a confection 50 therebetween. While all of the confections 50 shown in the drawings for illustrative purposes are provided with a handle stick 52, it will be obvious that the apparatus is not limited, and that bar type or handleless confections may be bagged by the apparatus without requiring any adjustments, attachments or alterations since the handle stick 52 is not employed for manipulating the confections through the apparatus. The confection magazine 45 is subdivided vertically by a series of transversely spaced vertical division plates 51, forming a series of pockets 53 of sufficient size to receive a plurality of the confections in stacked relationship. The outer free ends of each of the division plates 51 are provided with an integral laterally extending flange plate 55, which is adapted to extend transversely for a short distance across the front side of each of the adjacent pockets 53. It will therefore be noted that the flange plates 55 of adjacent division plates 51 do not meet and completely close the back side of each pocket 53, but are so spaced as to provide a vertical slot 57 centrally of each pocket 53, which slot 57 is open at both ends to permit the passage of handle sticks 52 therethrough when stick confections are being bagged on the apparatus. In the illustration shown there are six pockets 53 formed in the confection magazine, and the spacing or division of these pockets conform to the spacing arrangement of the six longitudinally spaced rows of confections when they are held in a conventional stick holder or spur plate (not shown). The slot 57 permits the protruding ends of the handle sticks 52 to project therethrough, or the projecting ends of the spurs of a spur plate (upon which bar types of confections are frozen and manipulated until they are ready for bagging) to pass therethrough. Of course, any numbers of pockets may be provided, as desired, depending upon the number of rows in the portable carrier used in freezing the confections, without departing from the spirit of the present invention. It will be obvious that the apparatus has been so designed that less than all or any given number of pockets may be filled with confections and the apparatus will bag such confections as efficiently as if all of the pockets were supplied with confections. An abutment in the form of a rod 59 is welded or otherwise secured centrally of the inner front side of the pockets 53 against which the forward or top sides of the confections rest when they are properly positioned therein. The rods 59 serve to limit the amount of frictional surface engagement of the top side of the confection 50 with the forward side of the confection magazine 45 in order to reduce or minimize breakage of the fragile outer shell of chocolate or other coating covering the coated types of confections. This rod 59 also serves to prevent large surface areas of the confections 50 from frictionally contacting the magazine 45 and becoming bonded thereto by the latent refrigeration in the confection, whereby they will be prevented from gravitating downwardly until the lowermost confection rests on the table top of the supporting platform 10, which is its normal position for being engaged by the pusher bars 46 and being moved through the apparatus.

A bag magazine 61 is correspondingly mounted adjacent the opposite end of the supporting platform 10 by corresponding brackets 63, which in turn are suitably braced by brace rods 65. The bag magazine 61 is similarly subdivided into pockets 67 by vertical division plates 66, the number of pockets 67 corresponding to the number of pockets of the confection magazine 45, as best shown in Fig. 1. Each of the pockets 67 is provided adjacent its lower ends with suitable stops or supporting flanges 69 and 71 for supporting stacks of bags 70 in proper position therein and in spaced relation to the table top supporting platform 10. It will be noted that the larger flanges 69 are of triangular shape, and that the smaller flanges 71 are of angular shape so that they will engage only the longer front or label side 68 of a conventional bag 70, which side forms a suitable finger tab for opening the bag. With this construction the shorter back side 72 of a conventional bag will hang freely and depend downwardly when the bags 70 are properly positioned in the bag magazine with their longer or label sides facing upwardly, as best shown in Fig. 5. It will thus be apparent that the apparatus is capable of using conventional types of confection bags, and that no special bag construction is required for the apparatus.

Since the bags 70 are of wider dimensions than the confections 50, since they must receive the same, it is necessary to construct the wider pockets 67 of the bag magazine 61 on wider centers than the pockets 53 of the confection magazine 45. Accordingly, the confections 50, when they are being moved from the confection magazine 45 to the bag magazine, must be spread out sufficiently to allow for such increase in width dimensions of the bags 70 over the confections 50. Therefore, a series of guideways or passageways 73 must be provided for keeping the several rows of confections in proper alignment from the confection magazine 45 to the bag magazine 61. The passageways 73 are formed by a series of longitudinally extending vertical guide plates 75, which are mounted over the table top supporting platform 10 in spaced relation thereto, being supported by spaced angle iron cross-bars 77 and 79. These guide plates 75 must be mounted above the platform 10 sufficiently high to allow enough clearance therebetween to permit passage of the pusher bars 46 thereunder, but must not be high enough to permit passage of a confection thereunder. It will be noted that the cross-bar 77 is mounted between the brackets 47 supporting the confection magazine, and that the cross-bar 79 is mounted on upstanding channel shaped brackets 81 secured to the top of the supporting structure intermediate its ends by bolts 83. A top cover plate 85 is secured by bolts 87 to the cross-bar 77, covering the passageway leading out from under the confection magazine 45, and serves not only to provide additional anchoring means for the vertical guides 75 but also to prevent confections 50 from jumping out of their respective passageways as they are forced by the pusher bar 46 out of the confection magazine 45. The forward ends of the vertical guides 75 immediately in front of the bag magazine 61 are anchored together by suitable angular spacing clips 83, which are welded or otherwise permanently secured thereto. (See Fig. 7.)

Auxiliary guiding means in the form of pairs of spring metal fingers 87 are mounted above the table top platform 10 on the forward ends of each of the passageways or guideways 73, which fingers 87 are adapted to be moved toward and away from each other and into and out of the open ends of the bags 70 as the confections 50 are being pushed therebetween by the pusher bars 46. (See Fig. 7.) These fingers 87 are formed of flat spring steel, and, as best shown in Fig. 3, the one finger on one guideway is formed integrally with the opposite finger of the next adjacent guideway. Each pair of adjacent fingers 87 is secured by a rivet 89 to a flat metal spring strip 91, extending backwardly centrally over the passageway to the cross-bar 79 to which it is fastened by a bolt 93.

The lower bag 70 in each of the bag pockets 67 is initially opened by means of a blast or jet of air, which is operated by movement of the confection 50 along the guideway 73. An air inlet valve 93, which is connected to a constant source of air supply (not shown), is mounted by bolts 95 to the upright flange of the angle iron cross-bar 77, as best shown in Fig. 3. An air outlet line 97 leads from the valve 93 to a T-connection 99, where it subdivides into two lines 101 leading to opposite sides of a discharge pipe 103 extending transversely of the apparatus, and supported by rods 105 secured by bolts 107 to the cross-bar 79. The discharge pipe 103 is provided with a series of groups of small holes 109, which open forwardly and centrally of each passageway 73 toward the bag magazine. Each group, consisting of three small holes 109, is provided with a snugly encircling pivotally mounted collar member 111, which partially encircles the discharge pipe 103 adjacent said holes, forming a rotating sleeve valve. Each collar member or sleeve valve 111 has an outwardly extending lever 113 that is normally held by gravity downwardly and forwardly into its respectively aligned passageway 73 so that it will project directly into the path of movement of the confection 50 therethrough. When the lever 113 is projecting downwardly in its normal position, its respective collar member 111 covers the series of small holes 109 so that no air can escape, but as a confection 50 is moved therebelow it forces the lever 113 upwardly, moving the collar member 111 away from the holes 109 so that air may be permitted to escape from the discharge pipe 103. When the confection 50 has passed beyond the lever 113, the same is permitted to gravitate to its normal position, closing the holes 109, thereby stopping the flow of air therefrom. A series of transversely spaced air deflecting plates 115 are mounted on a suitable cross-bar 117, the spacing of the plates 115 being such that one each is provided above each passageway 73 between the air discharging valve 111 and the bag magazine 61. These plates 115 are angularly mounted so as to deflect the blast or jet of air downwardly and directly into the lowermost bag 70 of its respectively aligned pocket 67 of the bag magazine 61, as best shown in Figs. 4 to 6.

A rocker or tiltable plate member 119 is mounted through a transversely extending slot 120 in the table top supporting platform 10 immediately below the bag magazine 61. The rocker member 119 is fixedly mounted on a shaft 121, which has its ends suitably journalled in the supporting structure 10. The rocker plate member 119 has its backward side 123 weighted, as indicated at 125, in order that its lighter forward side 127 is normally held by gravity against the open bottom of the bag magazine 61. It will be apparent that as the confection 50 is moved into the open end of the bag 70 in the bag magazine 61, the pusher bar 46 will ride upwardly and over the forward side 127 of the rocker member 119, causing it to be moved downwardly and thereby permitting discharge of the bagged confectionery product into the receiving chute 129 mounted below and in spaced relation to the end of the table top supporting platform 10, which spacing permits passage of the pusher bars 46 below the platform 10 to begin their return movement under the supporting platform 10.

In operation of the apparatus, it will be assumed that the bag magazine 61 is properly loaded with collapsed confection bags 70 of conventional construction, having their shorter back sides 72 facing downwardly so as to depend freely of the supporting stops 71, and that the motor 24 is in operation so that the endless chains 44 are moving the pusher bars 46 across the top of the supporting platform 10 from the confection magazine 45 towards the bag magazine 61. The confection magazine 45 is now ready to be loaded from a conventional portable stickholder or spur plate (not shown), which device is turned on its side and positioned directly over the open tops of the pockets 53 of the confection magazine, with the handle sticks or spurs projecting through the slots 57 thereof. When the confections 50 are thus deposited in the confection magazine 45, they may be released from the carrier, whereupon the confections 50 will gravitate downwardly until the bottom confection is resting on the table top supporting structure. It will be obvious that additional confections may be deposited in the confection magazine 45 on top of the confections already positioned therein until the magazine is full. When the pusher bar 46 is moved underneath the confection magazine 45, it will engage the lowermost confections of each pocket, which are resting on the supporting platform 10, and move them forwardly into their respectively aligned passageways 73. As the confections 50 move forwardly along their respective passageways 73, they will engage the downwardly projecting levers 113 and move them upwardly, thereby rotating the sleeve valve 111 until the holes 109 are uncovered, which permits air to escape therefrom against the deflecting plate 115 and then into the bottom bag 70 of the bag magazine 61. The jet of air tends to blow the free back side of the bag downwardly while the stops 69 and 71 hold the front or label side securely in the bag magazine 61. The confection 50 is now about ready to pass between the auxiliary guide fingers 87, causing them to move outwardly and into the open end of the bellowed bag in the bag magazine. The confection 50, being longer than the distance between the lever 113 and the auxiliary guide fingers 87, causes the latter to be moved into the partially open bag before it passes beyond the lever 113, permitting it to drop down to its normal position, which in turn causes its rotating sleeve to close the holes in the air discharge line 103. When the confection 50 is moved into its proper position in the bag 70, it passes beyond the guide fingers 87, and they are permitted to return to their normal closed position, whereupon they are withdrawn from the bag 70. The pusher bar 46, while pushing the confection 50 into its respective bag 70, rides up over the front side 127 of the rocker member 119, forcing it to tilt downwardly, thereby releasing the bagged confection from the bag magazine 61 because the stops are insufficient to support the bag with a confection deposited therein, whereupon the pusher bar 46 forces the bagged confection into the receiving chute 129 as it passes through the slot 131 underneath the table top supporting platform 10. When the pusher bar 46 clears the front side 127 of the rocker member 119, its weighted back side 123 causes it to tilt back to its normal position with the front side 127 closing the bottom of the bag magazine 61.

It will be apparent from the foregoing description that the apparatus is capable of continuous operation, and that, when each of the pockets 53 of the confection magazine 45 is kept supplied with confections 50, six confections will be bagged every time a pusher bar moves across the table top 10. It will also be apparent that, if one or more of the pockets 53 of the confection magazine 45 is not supplied with confections 50, the apparatus will function just as efficiently for the remaining filled pockets 53, and that no bags 70 will be wasted by the apparatus because a pocket in the confection magazine 45 has been unfilled with confections. The air blowing mechanism does not operate unless a confection passes under its projecting lever 113 depending in its corresponding passageway. Neither do the fingers 87 open out and into the bag 70 unless a confection 50 passes therebetween. Consequently, no bag will be used in a pocket of the bag magazine 61 unless a confection 50 is being moved down its respectively aligned passageway. Since each of the levers 113 operate their respective air valves 111 independently of each other, it is apparent that the efficiency of the apparatus is not impaired if no confection is being moved through any given passageway.

Although we have only described in detail one form which our invention may assume, it will be apparent to those skilled in the art that the invention is not so limited, but that various modifications may be made therein without departing from the spirit thereof or from the scope of the appended claims.

What we claim is:

1. In a machine of the character described, a supporting platform, a confection magazine mounted in spaced relation above said platform for holding a plurality of stacked confections, a bag magazine mounted above said platform in spaced relation to said confection magazine for receiving a plurality of collapsed bags, means operating continuously in a single direction for moving a confection from said confection magazine into a bag in said bag magazine, guide means through which the confection is moved along said platform, and means operable by said confection for expanding the bottom bag in said bag magazine for reception of said confection.

2. In a machine of the character described, a supporting platform, a confection magazine mounted in spaced relation above said platform for holding a plurality of stacked confections, a bag magazine mounted above said platform in spaced relation to said confection magazine for receiving a plurality of collapsed bags, conveyor means for moving a confection from said confection magazine into a bag in said bag magazine, guide means through which the confection is moved along said platform, means operable by said confection for expanding the bottom bag in said bag magazine for reception of said confection, and a second guide means operable by said confection and movable into and out of the open end of said expanded bag to facilitate insertion of the confection therein.

3. In a machine of the character described, a supporting platform, a confection magazine mounted in spaced relation above said platform for holding a plurality of stacked confections, a bag magazine mounted above said platform in spaced relation to said confection magazine for receiving a plurality of collapsed bags, means for continuously rotating a pusher member for moving a confection from said confection magazine into a bag in said bag magazine, guide means through which the confection is moved along said platform, means operable by the confection for expanding the bottom bag in said bag magazine for reception of said confection, and means operable by said pusher member to prevent movement of the bag during insertion of the confection therein.

4. In a machine of the character described, a supporting platform, a confection magazine mounted in spaced relation above said platform for holding a plurality of stacked confections, a bag magazine mounted above said platform in spaced relation to said confection magazine for receiving a plurality of collapsed bags, conveyor means for moving a confection from said confection magazine into a bag in said bag magazine, guide means through which the confection is moved along said platform, means including an air jet operable by movement of the confection for expanding the bottom bag in said bag magazine for reception of said confection, and an auxiliary guide means including a pair of expanding fingers operable by movement of said confection for movement into and out of the open end of said expanded bag to facilitate insertion of the confection therein.

5. In a machine of the character described, a supporting platform, a confection magazine mounted in spaced relation above said platform for holding a plurality of stacked confections, a bag magazine mounted above said platform in spaced relation to said confection magazine for receiving a plurality of collapsed bags, conveyor means for moving a confection from said confection magazine into a bag in said bag magazine, guide means through which the confection is moved along said platform, means including a lever mounted in spaced relation to said platform over said guideway and operable by passage of the confection thereunder for opening an air valve to release a jet of air therefrom, means for directing said jet of air into the open end of the bottom bag in said bag magazine for expanding the same, and an auxiliary guide means including a pair of laterally expanding and contracting fingers operable by passage of the confection therebetween for holding said expanded bag open until the confection has been inserted therein.

6. In a machine of the character described, a supporting platform, a confection magazine mounted in spaced relation above said platform for holding a plurality of stacked confections, a bag magazine similarly mounted above said platform in spaced relation to said confection magazine for receiving a plurality of collapsed bags, conveyor means for moving a confection from said confection magazine into a bag in said bag magazine and to discharge said bag and contents therefrom, means for expanding the bottom bag in said bag magazine as said confection approaches the same, means movable into and out of the open end of said expanded bag for guiding the confection therein, and means operable by said moving conveyor means for preventing movement of the bag during insertion of the confection therein while the same is held in said bag magazine and to discharge the bag therefrom after said confection has been inserted in said expanded bag.

7. In a machine of the character described, a supporting platform, a confection magazine mounted in spaced relation above said platform for holding a plurality of stacked confections, a bag magazine similarly mounted above said platform in spaced relation to said confection magazine for receiving a plurality of collapsed bags, conveyor means for moving a confection from said confection magazine into a bag in said bag magazine and to discharge said bag and contents therefrom, means for expanding the bottom bag in said bag magazine as said confection approaches the same, means movable into and out of the open end of said expanded bag for guiding the confection therein, and tiltable means for preventing movement of the bag during insertion of the confection while the same is held expanded in said bag magazine, said tiltable means being operable by said moving means to permit discharge of the bagged confection therefrom.

8. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, means adapted to be moved over said supporting platform for moving a plurality of confections from said confection magazine to said bag magazine, spaced guide means mounted on said platform for forming a series of passageways for guiding said confections from said confection magazine to said bag magazine, means mounted in said passageways operable by movement of confections therethrough for causing each of the bottom bags in said bag magazine to be expanded, and auxiliary guide means mounted adjacent the ends of each of said passageways adapted to be moved into and out of said open ends of said expended bags for facilitating insertion of the confections therein.

9. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, means adapted to be moved over said supporting platform for moving a plurality of confections from said confection magazine to said bag magazine, spaced guide means mounted on said platform for forming a series of passageways for guiding said confections from said confection magazine to said bag magazine, means mounted in said passageways including a series of levers operable by movement of the confections therethrough for causing a jet of air to expand the bottom bags of each column in said bag magazine, auxiliary guide means including a series of expanding fingers adapted to be moved into the open ends of said expanded bags by said confections for facilitating insertion of the confections therein, and means operable by said moving means to prevent movement of the expanded bags until said confections have been inserted therein and then to permit discharge of the bagged confections from said bag magazine.

10. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, endless means having a series of spaced pusher members adapted to be moved continuously over the top surface of said supporting platform for moving a plurality of confections from said confection magazine to said bag magazine, a series of transversely spaced guide means mounted above said platform for providing a series of passageways for guiding said confection from said confection magazine to said bag magazine, means including a series of levers projecting into each of said passageways operable by movement of the confection therethrough for opening a valve to permit a jet of air to be directed against the bottom bag in said column aligned with said passageway for expanding said bag, auxiliary guide means including a pair of resilient fingers movable by said confection into said expanded bag to facilitate insertion of said confection therein, and means including a rocker member for holding said expanded bag in said magazine until said confection is positioned therein and then to permit discharge therefrom.

11. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, endless means having a series of spaced pusher members adapted to be moved continuously over the top surface of said supporting platform for moving a plurality of confections from said confection magazine to said bag magazine, a series of transversely spaced guide means mounted above said platform for providing a series of passageways for guiding said confection from said confection magazine to said bag magazine, means including a series of levers projecting into each of said passageways operable by movement of the confection therethrough for opening a valve to permit a jet of air to be directed against the bottom bag in said column aligned with said passageway for expanding said bag, means for deflecting said jet of air directly into the open end of said bottom bag, auxiliary guide means including a pair of resilient fingers movable by said confection into said expanded bag to facilitate insertion of said confection therein, and means including a rocker member for holding said expanded bag in said magazine until said confection is positioned therein and then to permit discharge therefrom.

12. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, endless means having a series of spaced pusher members adapted to be moved continuously over the top surface of said supporting platform for moving a plurality of confections from said confection magazine to said bag magazine, a series of transversely spaced guide means mounted above said platform for providing a series of passageways for guiding said confection from said confection magazine to said bag magazine, means including a series of independently operable levers projecting into each of said passageways each adapted to be operated independently of the others by movement of a confection through its respective passageway for opening an air valve to permit a jet of air to escape therefrom for expanding the bottom bag in the correspondingly aligned columns of the bag magazine, auxiliary guide means including a series of resilient fingers adapted to be moved by passage of a confection therebetween into the open ends of its aligned expanded bag to facilitate insertion of the confection therein, means including a tiltable member which is normally held adjacent the open bottoms of said columns of said bag magazine for holding said expanded bags in said magazine until the confections are positioned therein and then adapted to be tilted away from said bag magazine by said pusher member as the same moves thereover to eject the bagged confections from their respective columns.

13. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, endless means having a series of spaced pusher members adapted to be moved continuously over the top surface of said supporting platform for moving a plurality of confections from said confection magazine to said bag magazine, a series of transversely spaced guide means mounted above said platform for providing a series of passageways for guiding said confection from said confection magazine to said bag magazine, means including a series of independently operable levers projecting into each of said passageways each operable by movement of the confection through its respective passageway for opening a valve to permit a jet of air to escape therefrom, means for deflecting said jet of air into the open end of said bottom bag of its respective column for expanding the same, auxiliary guide means including a pair of spring fingers adapted to be expanded by passage of the confection therebetween into the open ends of the said expanded bag aligned with its corresponding passageway to facilitate insertion of the confection therein, and means including a rocker member which is normally held against the bottoms of said bag magazine for holding said expanded bags in said magazine until said confections are positioned therein and then adapted to be rocked by said pusher member to permit discharge of the bagged confections therefrom.

14. In a machine of the character described, a supporting platform, a confection magazine mounted in spaced relation above said platform for holding a plurality of spaced columns of stacked confections with the bottom confection of each column resting on said platform, a bag magazine mounted above said platform having a plurality of spaced columns for receiving a corresponding number of stacks of collapsed bags, means for holding the bottom bag of each stack in spaced relation above said platform, endless means having a series of spaced pusher members adapted to be moved continuously over the top surface of said supporting platform for moving a plurality of confections from said confection magazine to said bag magazine, a series of transversely spaced guide means mounted above said platform for providing a series of passageways for guiding said confection from said confection magazine to said bag magazine, means including a series of independently operable levers projecting one each into each said passageways whereby they will be engaged by a confection moving therein for opening a valve to permit a jet of air to be released, means for deflecting said released jet of air against the open end of the bottom bag of its respectively aligned column to cause the same to be expanded, a series of auxiliary guide members each including a pair of resilient fingers normally held in closed position adjacent the discharge end of said passageways which are spread into said expanded bags by movement of a confection therebetween to hold the bag open in its expanded position while its respective confection is moved therein, means including a tiltable member which is normally held by gravity adjacent the open bottoms of said columns of said bag magazine for holding said expanded bags in said magazine while confections are being positioned therein and which is then adapted to be tilted away from said bag magazines by said confection pusher member as the same moves thereover to eject the bagged confections therefrom.

ABRAHAM H. BAYER.
GORDON BEYETTE.